United States Patent Office 3,223,661
Patented Dec. 14, 1965

3,223,661
ULTRAVIOLET LIGHT STABLE VINYL
CHLORIDE RESIN
Herbert M. Bond, Stillwater Township, Washington
County, Minn., assignor to Minnesota Mining and
Manufacturing Company, St. Paul, Minn., a corporation of Delaware
No Drawing. Filed July 5, 1960, Ser. No. 40,540
8 Claims. (Cl. 260—23)

This invention relates to vinyl chloride resin compositions which are unusually resistant to ultraviolet light.

Vinyl chloride resins are widely used in a variety of applications, e.g., as coatings for fabrics for use as upholstery material, as casting resins in the production of toys and household articles, and in sheet form as raincoats, luggage covering, shower curtains, shoe soles, and adhesive tape backings. A major shortcoming has been their tendency to discolor and become brittle when exposed to ultraviolet light. The only satisfactory means heretofore known for stabilizing these resins against ultraviolet light has been to incorporate therein large amounts of pigment having high hiding power, such as carbon black or titanium dioxide.

The present invention makes possible for the first time transparent or lightly pigmented vinyl chloride resins which can withstand prolonged exposure to ultraviolet light. Coupled with the inherently good resistance of the vinyl chloride resins to water and abrasion, this invention opens a variety of outdoor applications. For example, the novel compositions in sheet form offer decorative, long-life covering material for geodesic domes.

Briefly, the ultraviolet resistance is attained by stabilizing vinyl chloride resins with a modified polyester of polyhydric aliphatic alcohol and long-chain fatty acid having, per average molecular weight, about one-half or more aryloxy groups and about one or more oxirane groups directly and laterally attached to carbon atoms of the fatty acid radicals. The polyester stabilizer may be prepared by procedures disclosed in the application of Robert L. Wear, Serial No. 523,367 (now Patent No. 2,944,035), e.g., by blending in an alkaline medium an epoxidized polyester of polyhydric aliphatic alcohol and long-chain fatty acid having, per average molecular weight, about 1.5 or more oxirane groups directly and laterally attached to carbon atoms of the fatty acid radicals of the polyester with an aromatic compound having at least one phenolic hydroxyl radical, and heating the blend to convert about one-half or more oxirane groups per average molecular weight of the polyester to aryloxy and hydroxyl radicals directly and laterally attached to adjacent carbon atoms of the fatty acid radicals of the polyester while leaving about one or more oxirane groups per average molecular weight.

The polyester stabilizer of the novel compositions may be prepared from a large number of epoxidized polyesters, both natural and synthetic, but the low cost of epoxidized natural oils such as cottonseed, corn, lard, soybean, rapeseed, linseed, castor and peanut oils places them in a preferred position. The natural oils are largely comprised of mixed triglycerides of unsaturated fatty acids of about 18 carbon atoms; and in each, the double bonds are at least eight carbon atoms removed from the acyl carbon atoms. Preferably, epoxidation has been carried to the extent that at least three double bonds have been converted to epoxy groups, but this is not essential, and some suitable natural triglycerides cannot be epoxidized to this degree. In any event, the fatty acid chains of the polyester should include at least 12 carbon atoms.

A wide variety of aromatic compounds having at least one phenolic hydroxyl radical are suitable for use as reactants with the epoxidized polyesters to produce the polyester stabilizer of the novel compositions, e.g., resorcinol, hydroquinone, phenol, naphthol, salicylic acid, p-phenyl phenol, cardanol, p-tertiary butyl phenol, and 2,2-bis(4-hydroxyphenyl)propane which is known in commerce as Bisphenol A. The reaction proceeds between a phenolic hydroxyl group and an epoxy or oxirane group in the following manner, using phenol as an example:

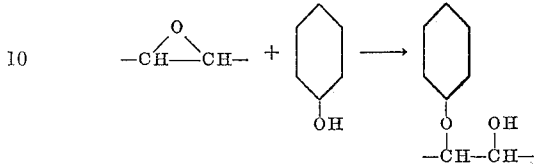

If more than one hydroxyl group or if some other functional group is present on the aromatic ring, each can react with separate epoxy groups. However, after one hydroxyl group of a polyhydric phenol reacts, the other groups are rendered much less reactive and to a large extent remain unreacted after completion of a moderate heating cycle.

Effective resistance to ultraviolet light is imparted to vinyl chloride resins with the use of as little as two parts of the polyester stabilizer per 100 parts resin. At about 5–10 parts, optimum ultraviolet resistance is attained, but any amount may be used up to the limit of compatibility, a limit manifested by a greasy exudate on film of the resin.

The term "vinyl chloride resins" as used herein includes both the monochloride and dichloride (vinylidene chloride) and encompasses both homopolymers and copolymers, but it is preferred that the copolymers comprise at least 85% by weight of one of the monochloride or dichloride. Up to about 15% of the copolymer may be derived from another ethylenically unsaturated compound, e.g., at least 85% of the monochloride and up to 15% of the dichloride, vinyl acetate, ethylene, styrene, fumaric acid esters, and acrylic compounds such as methyl methacrylate, octyl acrylate or acrylonitrile. Likewise, at least 85% of the copolymer may come from the dichloride, with up to 15% of the monochloride or acrylonitrile. At more than about 15% of the additive co-monomer, the stabilized vinyl resins of this invention tend to have lower softening points than are desirable in uses for which they are primarily intended. Since unstabilized polymers of the dichloride are inherently more resistant to ultraviolet light than are the polymers of the monochloride, the improvement attained with the latter is much more dramatic and of particular commercial significance.

Below are preparations of specific polyester stabilizers of proven utility in the novel compositions of this invention. Each was prepared from epoxidized soybean oil having an oxirane oxygen content of about 6.9% and about 4.3 epoxy groups per average molecular weight (about 1000) and having a Brookfield viscosity at 25° C. of less than 2 poises.

Polyester stabilizer A

To 1000 grams of the epoxidized soybean oil was added with stirring 222 grams of 2,2-bis(4-hydroxyphenyl)propane (Bisphenol A), and the temperature was raised to 100° C. With continued stirring, 3.7 ml. of pyridine was added to catalyze the reaction, and the mixture was held at 120–130° C. for two hours and then cooled. The dark brown product had a Brookfield viscosity of about 95 poises at 25° C. and an oxirane oxygen content of 3.9%. As calculated from oxirane oxygen, about 69% of the phenolic hydroxy groups of the Bisphenol A had reacted with the epoxidized oil, and since the reaction of one of the hydroxy groups would render the other much less reactive, it is apparent that substantially all of the Bisphenol A entered into the reaction. Accordingly, the product (polyester stabilizer A) contained roughly three epoxy groups and one bisphenoxy group per average molecular weight.

*Polyester stabilizer B*

The procedure for preparing polyester stabilizer A was carried out under a nitrogen atmosphere, except that 4 ml. of N,N-dimethylbenzyl amine was used as the catalyst. The light amber product had a Brookfield viscosity at 25° C. of 40 poises and an oxirane oxygen content of 4.9%. This would indicate that only about 60% of the Bisphenol A entered into the reaction, assuming only one phenolic hydroxy group reacted. On this basis, the polyester stabilizer contained about 3½ epoxy groups and one-half bisphenoxy group per average molecular weight. The portion of unreacted Bisphenol A was not removed from the product when it was used to stabilize vinyl chloride resin.

*Polyester stabilizer C*

Following the same preparation as polyester stabilizer A, 135 grams of epoxidized soybean oil and 15 grams of resorcinol were reacted using 1 ml. of pyridine as catalyst. The deep amber product had an oxirane oxygen content of 4.5%, indicating that 58% of the resorcinol hydroxy groups reacted with the epoxidized oil. Hence, the product included about three epoxy groups and one resorcinoxy group per average molecular weight.

*Polyester stabilizer D*

Under a nitrogen blanket as in preparing polyester stabilizer B, 200 grams of epoxidized soybean oil and 20.7 grams of phenol were reacted using 1.5 ml. of N,N-dimethylbenzylamine as catalyst. Brookfield viscosity of the light amber product was 7.5 poises and its oxirane oxygen content was 5.9%. Accordingly, only about 18% of the phenol was reacted, and the polyester stabilizer contained only about one-quarter phenoxy group per average molecular weight. When this product was tested as a stabilizer for vinyl chloride resin as disclosed hereinbelow, the large proportion of unreacted phenol may have had a supplementary effect.

*Polyester stabilizer E*

Under a nitrogen blanket, 31.2 grams of salicylic acid were added to 200 grams of epoxidized soybean oil with stirring, and the temperature was increased to about 90° C. over a period of one-half hour. By this time the mixture had gelled and was cooled to room temperature to discontinue the reaction. Apparently a large number of both the carboxyl and phenolic hydroxy groups of the salicylic acid had reacted with the epoxidized soybean oil to crosslink it to some extent.

Each of the foregoing aryloxy-modified epoxidized polyesters was tested as a stabilizer for a typical vinyl chloride resin, i.e., the copolymer of 97 parts vinyl chloride and 3 parts vinyl acetate ("VYNW"), by sheeting out compositions of the vinyl resin and stabilizer and exposing the film to ultraviolet light. Also included in each composition was a typical polyester plasticizer prepared from the following ingredients:

|  | Moles |
|---|---|
| Adipic acid | 2.12 |
| 1,2-propylene glycol | 1.10 |
| 1,4-butane diol | 1.52 |
| Lauric acid | 1.00 |
| Acetic anhydride | 0.50 |

This polyester plasticizer had an acid number of about 2–3, a molecular weight estimated from intrinsic viscosity in methyl ethyl ketone of 3900, and a Brookfield viscosity at 25° C. of 20 poises. In addition, low molecular weight polyethylene was employed as a lubricant.

Films of the compositions were prepared by first mixing the ingredients for 30 minutes in a Sprout-Waldron ribbon blender, fusing the mixture in a Banbury mixer until a temperature of 150° C. was attained, and then feeding the mixture into a four-roll, inverted-L calender with rolls maintained at 150° C., to produce a film 0.006 inch (6 mils) in thickness. Films of the following compositions were prepared for testing:

|  | Film Composition | | | | | | | | | |
|---|---|---|---|---|---|---|---|---|---|---|
|  | #1 | #2 | #3 | #4 | #5 | #6 | #7 | #8 | #9 | #10 |
| Vinyl chloride copolymer ("VYNW") | 100 | 100 | 100 | 100 | 100 | 100 | 100 | 100 | 100 | 100 |
| Polyester plasticizer | 50 | 40 | 40 | 40 | 40 | 40 | 50 | 40 | 50 | 40 |
| Polyethylene lubricant | 1 | 1 | 1 | 1 | 1 | 1 | 1 | 1 | 1 | 1 |
| Epoxidized soybean oil |  |  | 10 | 10 |  |  |  |  |  |  |
| Bisphenol A |  |  |  | 0.5 |  |  |  |  |  |  |
| Polyester Stabilizer A |  |  |  |  | 10 |  |  |  |  |  |
| Polyester Stabilizer B |  |  |  |  |  | 10 |  |  |  |  |
| Polyester Stabilizer C |  |  |  |  |  |  | 10 |  |  |  |
| Polyester Stabilizer D |  |  |  |  |  |  |  | 2 | 10 |  |
| Polyester Stabilizer E |  |  |  |  |  |  |  |  | 2 | 10 |

Pieces of the film, 4 by 6 inches in size, were laid on a tin-plated steel plate which was covered with polytetrafluoroethylene film and carried on a 15-inch turntable. Seven inches above the turntable was an ultraviolet lamp (General Electric "S–1" lamp) mounted in a photoflood reflector. During the test, the turntable was rotated continuously and the positions of the pieces of film were changed daily except weekends. In the test, heat generated from the lamp raised the temperature at the turntable to about 50–55° C., no provision being made for cooling.

In a first test, films #4 and 6 along with films #2 and 3 as controls were exposed for seven days, at which time ½-inch strips were slit from each and tested at a temperature of 23° C. using the Instron Tensile Tester at a rate of 12 inches per minute. Film #4 had a tensile strength of 2870 p.s.i. at 50% elongation and broke normally at an elongation of 130%. Film #6 had a tensile strength of 2570 p.s.i. at 50% elongation and broke normally at an elongation of 125%. Both of these films were still flexible and transparent and unchanged in their original amber tinge. In contrast, control film #2 was slightly brittle and heavily spotted and broke at an elongation of only 5%. Control film #3 had a tensile strength of 2685 p.s.i. but shattered on breaking at 120% elongation and was moderately spotted.

After a total of 280 hours under the ultraviolet lamp, film #4 was too brittle to slit but had experienced no color change except for very slight speckling. Film #6 was slightly brittle and had a tensile strength of 5500 p.s.i. at a break elongation of 20%. It was only slightly speckled. In contrast control film #2 was too brittle to handle and control film #3 was too brittle to slit and heavily speckled.

It should be noted in considering film #3 as a control, that it is believed that mixtures of epoxidized polyesters and phenolic compounds have never been suggested in the prior art for use in stabilizing vinyl resins against ultraviolet light. The film is simply described here for purposes of showing the importance of prereaction for best results.

In a second test, a new ultarviolet lamp was used (also an "S-1" lamp), and since this lamp is inefficient for the first 50 hours, the results are not fully comparable to those of the first test. In this second test, films #5, 7, 8, 9 and 10 were compared to film #1 as control. After 220 hours under the ultraviolet lamp, control film #1 was speckled with brown, had developed an overall cloudiness and had become rough to the touch. In contrast, each of the other films was unspotted, smooth and as clear as or clearer than before the test. When tested on the Instron, the films experienced decreased elongation as a result of the ultraviolet exposure as follows:

| Film #: | Percent decrease in elongation |
| --- | --- |
| 1 | 62 |
| 5 | 20 |
| 7 | 59 |
| 8 | 33 |
| 9 | 52 |
| 10 | 19 |

Nine-mil thick film of essentially the composition as that of film #6, including only 5 parts of polyester stabilizer C and also containing about five parts of green pigment, was primed with a synthetic ruber-resin primer composition and coated with a rubber-resin pressure-sensitive adhesive based on equal parts of crude rubber and rubbery butadiene-styrene copolymer, with polymerized terpene as the tackifier resin. Strips of this tape were adhered by its adhesive to the polytetrafluoroethylene surface of the above-described turntable apparatus along with strips of identical tape, save for the omission of the polyester stabilizer C from the composition of the film backing. After 280 hours, the tape containing polyester stabilizer C was essentially unchanged in appearance, flexibility and adhesiveness and its backing was smooth and dry, whereas the backing of the other tape was noticeably faded and oily in appearance and was sticky to the touch. Also, the tape appeared to have somewhat decreased adhesion to the polytetrafluoroethylene surface.

In making transparent pressure-sensitive adhesive tape using the backing of the novel compositions of this invention, a more preferred class of adhesives is disclosed in U.S. Patent No. 2,884,126, which adhesives remain crystal clear after prolonged exposure to ultraviolet light.

*Film composition #11*

A composition identical to that of film #4 above was prepared and formed into a film in the same manner except that the polyester plasticizer was omitted, the proportion of polyester stabilizer A was increased to 50 parts per 100 parts of the vinyl copolymer, and there was added one part of organic inhibitor ("Ferro 903") and one part of coprecipitated barium/cadmium soap of lauric acid ("Ferro 1820"). This film was somewhat brittle for most tape or sheet uses, having a tensile strength of 2900 p.s.i. at 10% break elongation. After exposure to the ultraviolet lamp for 280 hours in the first test along with films #2, 3, 4 and 6, this film had a tensile strength of 1150 p.s.i. at a break elongation of 5%. Although the surface of the film, even before aging, had a slight exudate (indicating the limit of compatibility had been just exceeded) it was free from speckling but had darkened very slightly in the test. The degree of exudation of the polyester stabilizer did not increase in the course of the test.

A specific utility for less flexible ultraviolet-resistant compositions such as that of film composition #11 (with the proportion of polyester stabilizer preferably reduced within compatibility limits) is as molded insulating blocks for outdoor electrical terminals. Likewise, these compositions may be used as plastisols in the manufacture of beach articles and toys intended for outdoor use.

As for the more flexible compositions of this invention, an especially important utility is in transparent film for plastic windows of greenhouses and porches. Other important utilities are in colored film for window curtains, in coated fabric for automobile upholstery, and in coated glass fiber for window screens.

I claim:
1. A homogeneous composition of matter having improved resistance to degradation under ultraviolet light comprising
   (1) 100 parts by weight of vinyl chloride resin selected from the group consisting of
      (a) vinyl chloride homopolymer,
      (b) vinylidene chloride homopolymer,
      (c) copolymers of vinyl chloride and up to about 15 parts by weight of copolymerizable monomer, and
      (d) copolymers of vinylidene chloride and up to about 15 parts by weight of copolymerizable monomer, and
   (2) at least two parts and not more than a compatible amount of a modified natural triglyceride having, per average molecular weight, at least one-half aryloxy group and at least one oxirane group directly and laterally attached to carbon atoms of the fatty acid radicals of the triglyceride, said carbon atoms being at least eight carbon atoms removed from the acyl carbon atoms of the triglyceride.

2. A composition of matter as defined in claim 1 wherein said natural triglyceride is soybean oil.

3. A composition of matter as defined in claim 1 wherein said vinyl resin is a copolymer of vinyl chloride with up to about 10% of its weight of vinyl acetate.

4. A stretchable and elastic film of the composition of matter defined in claim 1 having a thickness of 1 to 20 mils.

5. Pressure-sensitive adhesive tape having as its backing the film defined in claim 1.

6. A homogeneous composition of matter having improved resistance to degradation under ultraviolet light comprising
   (1) 100 parts by weight of vinyl chloride resin selected from the group consisting of
      (a) vinyl chloride homopolymer,
      (b) vinylidene chloride homopolymer,
      (c) copolymers of vinyl chloride and up to about 15 parts by weight of copolymerizable monomer, and
      (d) copolymers of vinylidene chloride and up to 15 parts by weight of copolymerizable monomer, and
   (2) about 2–10 parts by weight of a modified natural triglyceride having, per average molecular weight, at least one-half aryloxy group and at least one oxirane group directly and laterally attached to carbon atoms of the fatty acid radicals of the triglyceride, said carbon atoms being at least eight carbon atoms removed from the acyl carbon atoms of the triglyceride.

7. A homogeneous composition of matter having improved resistance to degradation under ultraviolet light comprising
   (1) 100 parts by weight of vinyl chloride homopolymer and
   (2) about 5–10 parts of modified soybean oil having, per average molecular weight, at least one-half aryloxy group and at least one oxirane group directly and laterally attached to carbon atoms of the soybean oil, said carbon atoms being at least 8 carbon atoms removed from the acyl carbon atoms of the modified soybean oil.

8. A homogeneous composition of matter having improved resistance to degradation under ultraviolet light comprising
   (1) 100 parts by weight of a copolymer of about 97 parts vinyl chloride and about 3 parts vinyl acetate and
   (2) about 5–10 parts of modified soybean oil having, per average molecular weight, at least one-half aryloxy group and at least one oxirane group directly and laterally attached to carbon atoms of the soybean oil, said carbon atoms being at least 8 carbon atoms removed from the acyl carbon atoms of the modified soybean oil.

References Cited by the Examiner
UNITED STATES PATENTS

| | | | |
|---|---|---|---|
| 2,783,250 | 2/1957 | Payne et al. | 260—45.8 |
| 2,895,966 | 7/1959 | Ault et al. | 260—23 |
| 2,912,397 | 11/1959 | Houska et al. | 260—23 |
| 2,944,035 | 7/1960 | Wear | 260—18 |
| 2,972,589 | 2/1961 | Steckler | 260—18 |

LEON J. BERCOVITZ, *Primary Examiner.*

A. D. SULLIVAN, M. STERMAN, J. A. SEIDLECK,
*Examiners.*